United States Patent [19]

Berrios

[11] Patent Number: 5,653,466
[45] Date of Patent: Aug. 5, 1997

[54] OPERATOR SUPPORTING PLATFORM FOR SELF-PROPELLED LAWN MOWERS

[76] Inventor: Joseph E. Berrios, 975 NW. 114th Ave., Coral Springs, Fla. 33071

[21] Appl. No.: 336,378

[22] Filed: Nov. 8, 1994

Related U.S. Application Data

[63] Continuation-in-part of Ser. No. 291,875, Aug. 17, 1994, abandoned.

[51] Int. Cl.$^6$ ............................ A01D 34/64; B62D 51/02; B62D 51/04
[52] U.S. Cl. ........................... 280/760; 180/19.1; 56/14.7; 280/166
[58] Field of Search ................................ 280/32.5, 32.7, 280/762, 760, 163, 164.1, 166; 180/19.1, 19.2, 19.3, 900, 11, 326; 56/2, 14.7

[56] References Cited

U.S. PATENT DOCUMENTS

| | | | |
|---|---|---|---|
| 3,485,314 | 12/1969 | Herr | 180/11 |
| 4,096,920 | 6/1978 | Heyn | 180/11 |
| 4,878,339 | 11/1989 | Marier et al. | 180/19.1 X |
| 5,117,944 | 6/1992 | Hurtevent | 280/32.7 X |

FOREIGN PATENT DOCUMENTS 5-97049  4/1993  Japan .................. 180/19.1

*Primary Examiner*—Kevin Hurley
*Attorney, Agent, or Firm*—Frank L. Kubler

[57] ABSTRACT

An improvement in a walk-behind, self-propelled lawn mower including a mower deck having an upper deck surface, a deck rear end and deck rear edge, several mower wheels, a mower engine, a pair of handle bars extending upward from the mower deck at the rear of the mower deck and steering controls includes a plate member for supporting a mower operator during mower use, a hinge pivotally connecting the plate member to the rear end of the mower deck, plate member abutment structure for stopping the plate member from pivoting to a position substantially below the plane of the mower deck. The hinge preferably includes a first hinge pin receiving element secured to the upper surface of the deck and spaced apart from the rear edge of the mower deck, and a second hinge pin receiving element secured to the plate member, and where the plate member abutment structure includes a portion of the mower deck between the first hinge pin receiving element and the rear edge. The abutment structure preferably includes a bracket element secured to the mower deck and extending rearwardly from the mower deck, the bracket element having an upper surface substantially coplanar with the upper surface of the mower deck for supporting the plate member when pivoted to a down position. A seat structure is optionally provided for the operator to sit upon, the seat being secured to and extending upward from the plate member.

8 Claims, 4 Drawing Sheets

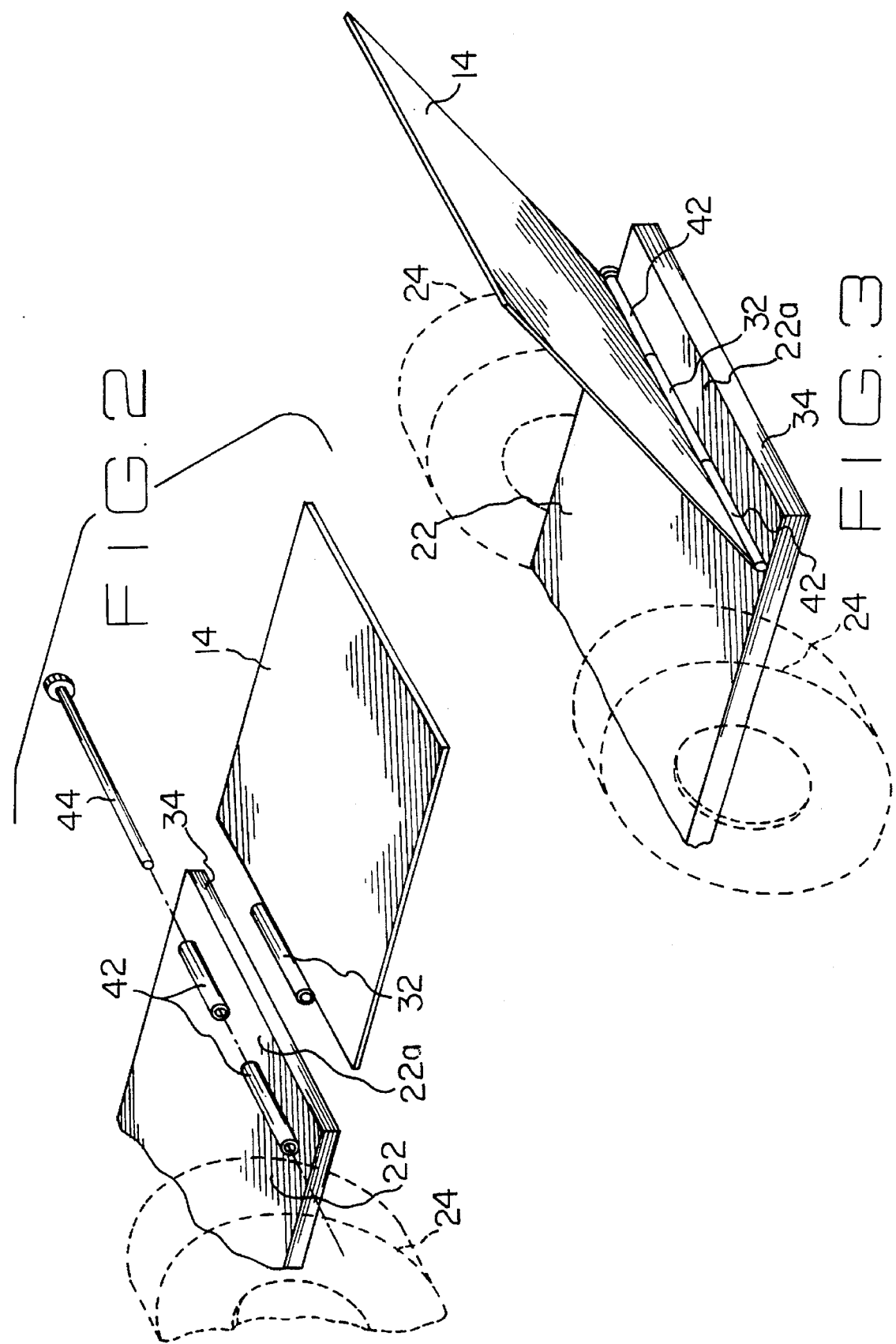

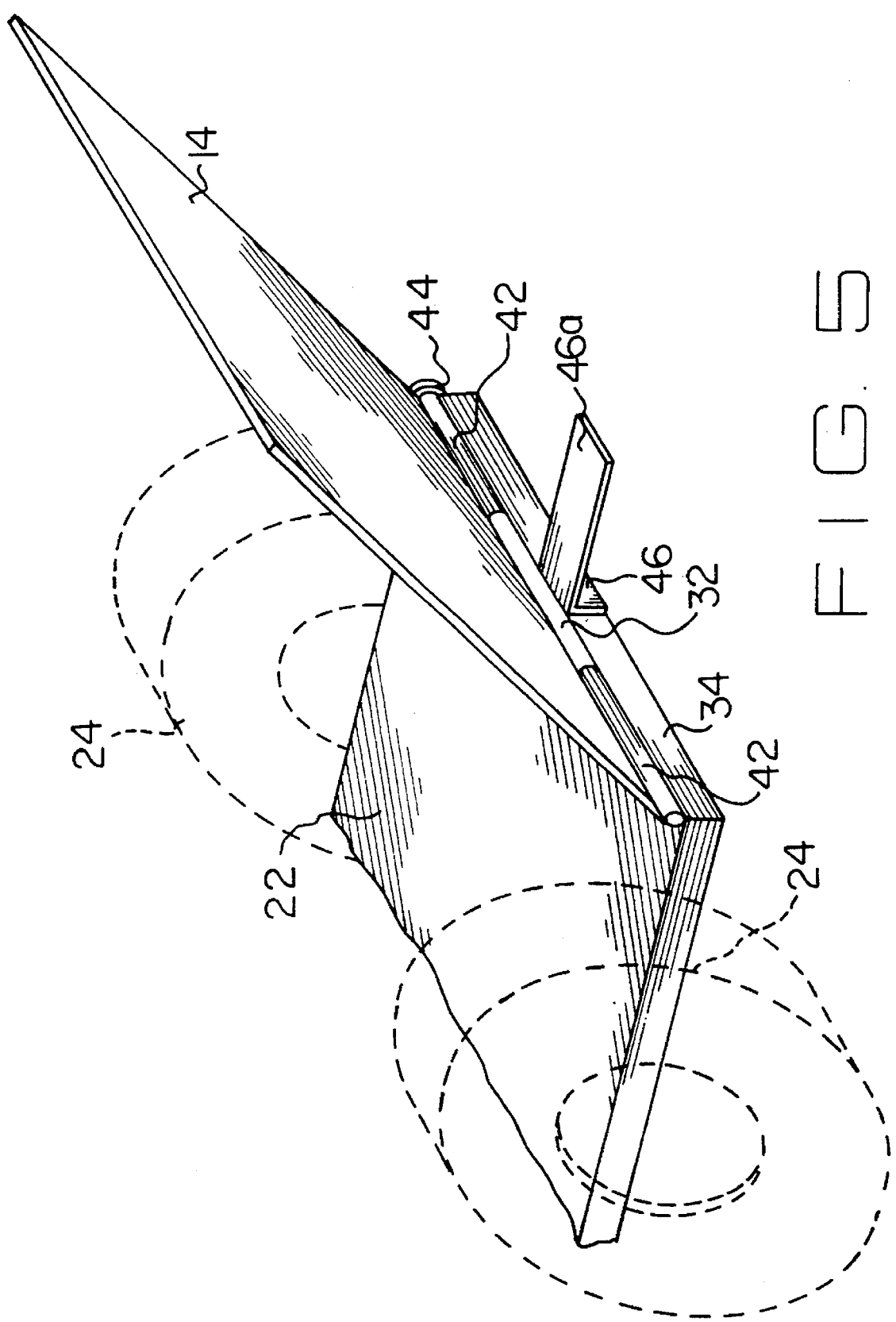

OPERATOR SUPPORTING PLATFORM FOR SELF-PROPELLED LAWN MOWERS

FILING HISTORY

This application is a continuation-in-part of application Ser. No. 08/291,875, filed on Aug. 17, 1994, now abandoned.

BACKGROUND OF THE INVENTION

1. Field of the Invention

The present invention relates generally to the field of walk-behind lawn mowers. More specifically, it relates to walk-behind, self-propelled lawn mower having a rearwardly extending platform on which the mower operator can stand during mower use. The platform is preferably pivotally mounted to the mower deck to extend rearwardly from between the rear wheels. The platform may be a heavy gauge steel plate. The pivotal mounting is preferably accomplished by welding a first metal tube segment to the top of the rear deck, parallel with and spaced inwardly from the rear edge of the deck. The inward spacing permits the portion of the mower deck rearward of the first tube segment to act as abutment means to support the plate in its deployed position. A pair of second tube segments are mounted along an edge of the metal plate so that they are axially aligned and sufficiently spaced apart to axially receive between them the first tube segment. The plate is removably and pivotally secured to the mower by inserting the first tube segment between the second tube segments so that they are substantially co-axial, and then inserting a pin through the tube segments. This arrangement permits the plate to pivot upward against the back of the mower structure to permit the operator to use the mower in a walk-behind mode, and to pivot downward to become substantially parallel with the mower deck to permit the operator to use the mower in a rider mode. The segment of the deck acting as abutment means supports the plate and operator. According to one embodiment, a seat structure may be provided on the platform.

2. Description of the Prior Art

There have long been tractors and riding lawn mowers permitting the operator to drive them as though they were an automobile. There have also been self-propelled, walk-behind mowers for which steering is accomplished by squeezing levers on opposing mower handle bars. The riding mowers have become prohibitively expensive and cumbersome for may people. On the other hand, the walk-behind, self-propelled mowers are very taxing physically to operate for long periods.

It is thus an object of the present invention to provide a platform structure for attachment to the rear of a walk-behind, self-propelled mower on which an operator can stand while operating the mower, thereby minimizing fatigue.

It is another object of the present invention to provide such a platform structure which pivots against or is removable from the mower when not in use and which may define a door covering a storage space within the mower.

It is still another object of the present invention to provide such a platform structure which optionally includes an upward extending seat structure.

It is still another object of the present invention to provide a mower which converts by pivoting upward or removing the platform structure from a rider type to a walker type, so that there are essentially two types of mowers in one.

It is finally an object of the present invention to provide such a platform structure which is simple and reliable in design and which is inexpensive to manufacture.

SUMMARY OF THE INVENTION

The present invention accomplishes the above-stated objectives, as well as others, as may be determined by a fair reading and interpretation of the entire specification.

An improvement is provided in a walk-behind, self-propelled lawn mower including a mower deck having an upper deck surface, a deck rear end and deck rear edge, several mower wheels, a mower engine, a pair of handle bars extending upward from the mower deck at the rear of the mower deck and steering controls, the improvement including a plate member for supporting a mower operator during mower use, a hinge pivotally connecting the plate member to the rear end of the mower deck, plate member abutment structure for stopping the plate member from pivoting to a position substantially below the plane of the mower deck. The hinge preferably includes a first hinge pin receiving element secured to the upper surface of the deck and spaced apart from the rear edge of the mower deck, and a second hinge pin receiving element secured to the plate member, and where the plate member abutment structure includes a portion of the mower deck between the first hinge pin receiving element and the rear edge. The abutment structure preferably includes a bracket element secured to the mower deck and extending rearwardly from the mower deck, the bracket element having an upper surface substantially co-planar with the upper surface of the mower deck for supporting the plate member when pivoted to a down position. A seat structure is optionally provided for the operator to sit upon, the seat being secured to and extending upward from the plate member.

A walk-behind, self-propelled lawn mower is also provided, including a mower deck having a rear end and rear edge, a plurality of mower wheels, a mower engine, a handle bar extending upward from the mower deck at the rear end of the mower deck, mower steering controls, a plate member for supporting a mower operator during mower use, a hinge pivotally connecting the plate member to the rear end of the mower deck, and a plate member abutment structure for stopping the plate from pivoting to a position substantially below the plane of the mower deck. The mower preferably additionally includes a frame structure secured to and extending above the mower deck, the frame structure defining an item storage area adjacent to the rear edge of the deck which opens rearwardly and is covered by the plate member when the plate member is pivoted to an upward position.

A walk-behind, self-propelled lawn mower is still further provided which includes a mower deck having a rear end and rear edge, a plurality of mower wheels, an engine mounted, a handle bar extending upward from the mower deck at the rear end of the mower deck, mower steering controls, a plate member for supporting a mower operator during mower use, structure for rigidly connecting the plate member to the rear end of the mower deck, and plate member abutment structure for supporting the plate member and a mower operator resting on top of the plate member.

BRIEF DESCRIPTION OF THE DRAWINGS

Various other objects, advantages, and features of the invention will become apparent to those skilled in the art from the following discussion taken in conjunction with the following drawings, in which:

FIG. 2 is a broken-away perspective view of the rear portion of the mower, with the preferred parts of the supporting platform structure hinge elements being illustrated in an exploded configuration.

FIG. 3 is a view as in FIG. 2, except that the plate is connected and the hinge assembled, and the plate is pivoted about half way between the non-deployed, upward position and the deployed, downward position.

FIG. 5 is a view as in FIG. 1, but is of the second preferred embodiment having the optional seat structure secured to the top of the plate.

DETAILED DESCRIPTION OF THE PREFERRED EMBODIMENTS

Figure 1:
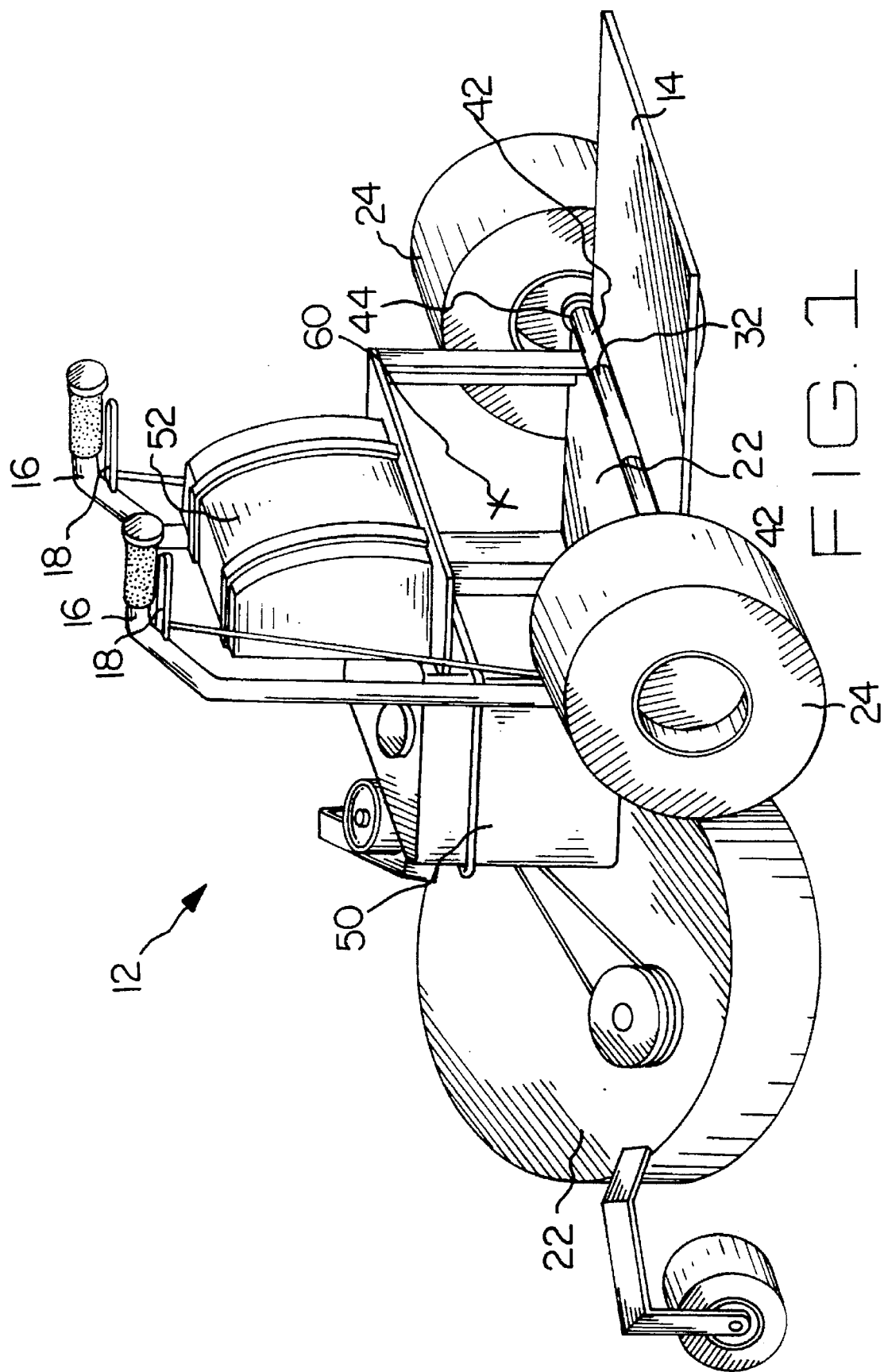
FIG. 1 is a perspective view of a walk-behind, self-propelled lawn mower equipped with the inventive operator supporting platform structure, the platform structure being shown in the downward, deployed position.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various figures are designated by the same reference numerals.

First Preferred Embodiment

Figure 4:
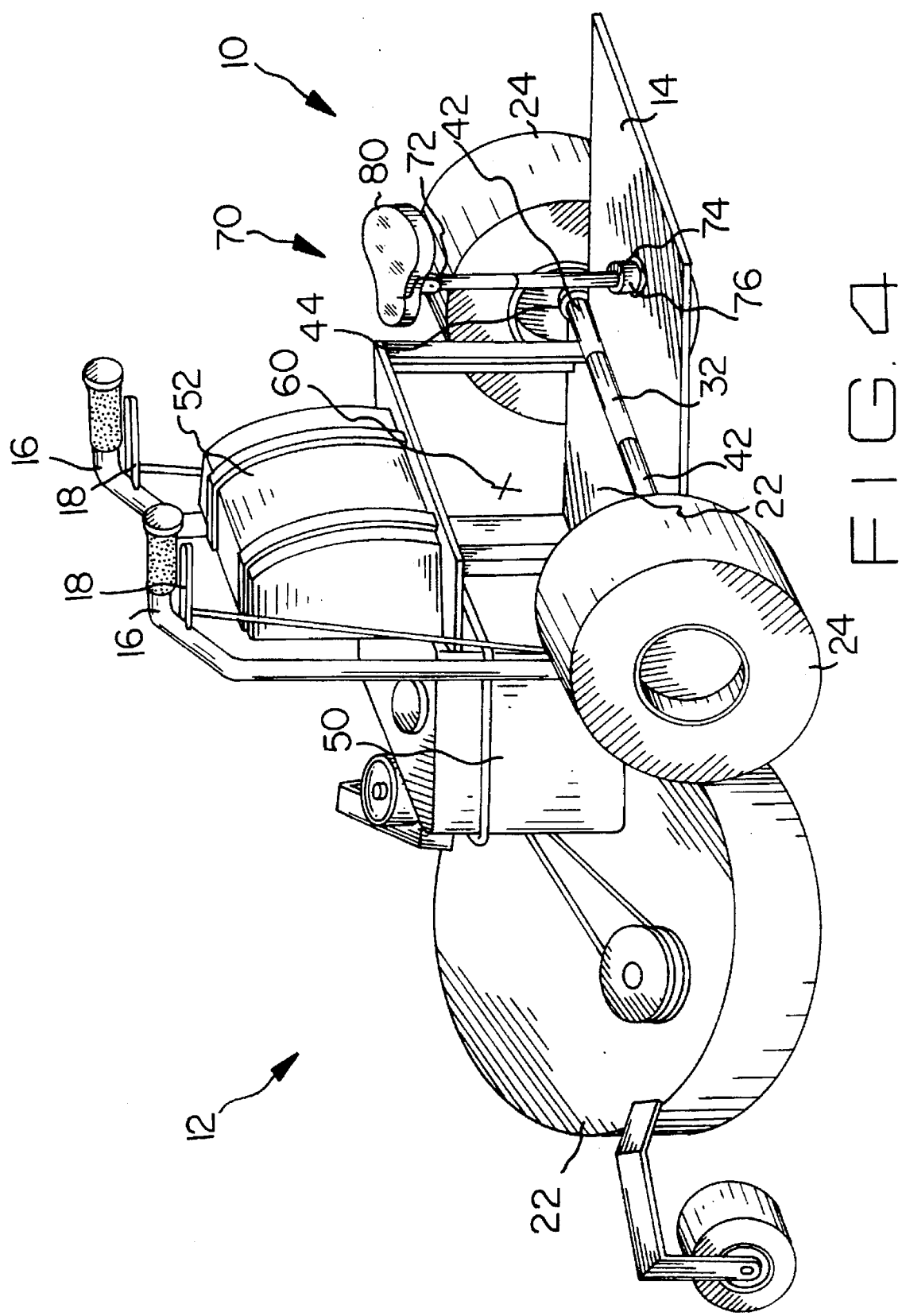
FIG. 4 is a view as in FIG. 3, except that a bracket structure replaces the rear end of the mower deck to function as the plate abutment means.

Referring to FIGS. 1–5, an operator supporting platform structure 10 is disclosed for a walk-behind, self-propelled lawn mower 12. Mower 12 has conventional handle bars 16 fitted with conventional steering control levers 18. Platform structure 10 includes a rearwardly extending plate 14 on which the mower operator can stand during mower 12 use. Plate 14 is preferably pivotally mounted to the rear end of the mower deck 22 to extend rearwardly from between the rear mower wheels 24 when deployed. Plate 14 may be formed of a heavy gauge steel, or any other suitable material.

The pivotal mounting is preferably accomplished by welding a metal first tube segment 32 to the top of deck 22, parallel with and spaced inwardly from the rear edge 34 of deck 22. See FIG. 2. The inward spacing permits the portion 22a of the mower deck 22 rearward of first tube segment 32 to act as abutment means 40 to support plate 14 in its deployed position. A pair of second tube segments 42 are mounted along an edge of plate 14 so that they are axially aligned and sufficiently spaced apart from each other to axially receive between them the first tube segment 32. Plate 14 is removably secured to mower 12 by inserting first tube segment 32 between second tube segments 42 so that they are all substantially co-axial, and by inserting a removable hinge pin 44 through tube segments 32 and 42. This arrangement permits plate 14 to pivot upward against the back of mower 12 and to pivot down to become substantially parallel with mower deck 22. See FIG. 3. The operator is thus able to convert mower 12 from a rider type to a walker type where required by particularly rugged or hilly terrain, and therefore has the benefit of both types of mowers in one.

Plate 14 preferably pivots slightly beyond vertical to lean against mower 12. The segment of deck 22 acting as abutment means supports the plate and operator. Many other hinge structures are contemplated as equivalent.

Other abutment means are also contemplated, such as a bracket 46 secured to the rear end of deck 22. See FIG. 4. A bracket arm portion 46a extends rearwardly and substantially co-planar with the upper surface of deck 22 so that plate 14 can fold down and rest on arm portion 46a.

The mower engine 50 must typically be located or re-located forward of its conventional mounting positioned to shift the mower 12 center of gravity forward. This shift offsets the weight of the operator on plate 14 so that the mower does not pivot backward about its rear wheel 24 axles. While offsetting the mower engine 50 in this way is contemplated as an aftermarket adaptation to permit the addition of the inventive platform structure 10 to an existing mower 12, it is preferred that platform structure 10 and necessary weight distribution be designed into mowers as original equipment. Weight may also be offset by securing a sufficiently heavy object to the forward end of mower deck 22.

In shifting the engine 50 and fuel tank 52 forward, an enclosed space 60 just forward of the plate 14 and underneath the mower fuel tank 52 may be created for some mower models. This space 60 can be used to retain trash or other items gathered from a yard during mowing. Other storage functions are contemplated for enclosed space 60. Space 60 becomes fully enclosed when plate 14 is folded up against mower 12, plate 14 acting much like a door to storage space 60. See FIG. 1.

Second Preferred Embodiment

A second embodiment of the platform structure 10 is like the first except that a seat structure 70 is secured to the top of plate 14. The preferred seat structure 70 is a bicycle type design which is adjustably mounted on a steel pole 72 attached to plate 14. See FIG. 5. The pole 72 is may be welded to plate 14. Alternatively, pole 72 may be removably fitted into a cup structure 74 welded to plate 14, the cup structure 74 having a lateral set screw 76 extending through a threaded bore its side wall to grip pole 72. Pole 72 may telescope to adjust the height of the seat 80 for various operators. Plate 14 may pivot as described for the first embodiment, or may be a permanent rigid extension of mower deck 22.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An improvement in a walk-behind, self-propelled lawn mower comprising a mower deck having an upper deck surface, a deck rear end and deck rear edge, a plurality of mower wheels, a mower engine, a pair of handle bars extending upward from the mower deck at the rear of the mower deck and steering control means, the improvement comprising:

a plate member for supporting a mower operator during mower use, hinge means pivotally connecting said plate member to said rear end of said mower deck, plate member abutment means for stopping said plate member from pivoting to a position substantially below the plane of said mower deck.

2. The mower of claim 1, wherein a seat structure for said operator to sit upon is secured to and extends upward from said plate member.

3. An improvement in a walk-behind, self-propelled lawn mower comprising a mower deck having an upper deck surface, a deck rear end and deck rear edge, a plurality of mower wheels, a mower engine, a pair of handle bars extending upward from the mower deck at the rear of the mower deck and steering control means, the improvement comprising:

a plate member for supporting a mower operator during mower use, hinge means pivotally connecting said plate member to said rear end of said mower deck, plate member abutment means for stopping said plate member from pivoting to a position substantially below the plane of said mower deck, wherein said hinge means comprises a first hinge pin receiving element secured to said upper surface of said deck and spaced apart from said rear edge of said mower deck, and a second hinge pin receiving element secured to said plate member, and wherein said plate member abutment means comprises a portion of said mower deck between said first hinge pin receiving element and said rear edge.

4. An improvement in a walk-behind, self-propelled lawn mower comprising a mower deck having an upper deck surface, a deck rear end and deck rear edge, a plurality of mower wheels, a mower engine, a pair of handle bars extending upward from the mower deck at the rear of the mower deck and steering control means, the improvement comprising:

a plate member for supporting a mower operator during mower use, binge means pivotally connecting said plate member to said rear end of said mower deck, plate member abutment means for stopping said plate member from pivoting to a position substantially below the plane of said mower deck, wherein said abutment means comprises a bracket element secured to said mower deck and extending rearwardly from said mower deck, said bracket element having an upper surface substantially co-planar with said upper surface of said mower deck for supporting said plate member when pivoted to a down position.

5. A walk-behind, self-propelled lawn mower, comprising:

a mower deck having a rear end and rear edge, a plurality of mower wheels, a mower engine, a handle bar extending upward from said mower deck at said rear end of said mower deck, mower steering control means, a plate member for supporting a mower operator during mower use, hinge means pivotally connecting said plate member to said rear end of said mower deck, plate member abutment means for stopping said plate from pivoting to a position substantially below the plane of said mower deck, wherein said mower additionally comprises a frame structure secured to and extending above said mower deck, said frame structure defining an item storage area adjacent to said rear edge of said deck which opens rearwardly and is covered by said plate member when said plate member is pivoted to an upward position.

6. A walk-behind, self-propelled lawn mower, comprising:

a mower deck having a rear end and a rear edge, a plurality of mower wheels including two rear wheels mounted proximal to said rear edge of said mower deck, a mower engine drivably connected to at least one of said rear wheels, a handle bar extending upward from said mower at said rear end of said mower deck, mower steering control means for controlling the rotational speed of one said rear wheel relative to the other said rear wheel, such that said mower turns about a vertical turning axis substantially between said rear wheels and at said rear end of said mower deck, a plate member for supporting a mower operator during mower use, hinge means pivotally connecting said plate member to said rear end of said mower deck, such that the operator rides proximal to said rear wheels and such that said plate member is proximal to said vertical turning axis, plate member abutment means for stopping said plate member from pivoting to a position substantially below the plane of said mower deck.

7. A self-propelled lawn mower, comprising:

a mower deck having a rear end and a rear edge, a plurality of mower wheels including two rear wheels mounted proximal to said rear edge of said mower deck, a mower engine drivably connected to at least one of said rear wheels, a handle bar extending upward from said mower at said rear end of said mower beck, mower steering control means for controlling the rotational speed of one said rear wheel relative to the other said rear wheel, such that said mower turns about a vertical turning axis substantially between said rear wheels and at said rear end of said mower deck, a plate member for supporting a mower operator during mower use, hinge means pivotally connecting said plate member to said rear end of said mower deck, such that the operator rides proximal to said rear wheels and such that said plate member is proximal to said vertical turning axis, plate member stopping means for stopping said plate member from pivoting to a position substantially below the plane of said mower deck.

8. A self-propelled lawn mower, comprising:

a mower deck having a rear end and a rear edge, a plurality of mower wheels including two rear wheels mounted proximal to said rear edge of said mower deck, a mower engine drivably connected to at least one of said rear wheels, mower steering control means, a plate member for supporting a mower operator during mower use;

securing means connecting said plate member to said rear end of said mower deck, such that the operator rides proximal to said rear wheels and such that said plate member is proximal to said vertical turning axis, plate member stopping means for stopping said plate member from pivoting to a position substantially below the plane of said mower deck.

* * * * *